United States Patent
Oliver et al.

(10) Patent No.: US 11,989,568 B2
(45) Date of Patent: May 21, 2024

(54) METHOD TO EXECUTE A MODE-TRANSITION IN A MULTI-MODE COMPUTER SYSTEM

(71) Applicant: TTTech Auto AG, Vienna (AT)

(72) Inventors: Ramon Serna Oliver, Vienna (AT); Paraskevas Karachatzis, Vienna (AT); Silviu Craciunas, Vienna (AT)

(73) Assignee: TTTech Auto AG, Vienna (AT)

( * ) Notice: Subject to any disclaimer, the term of this patent is extended or adjusted under 35 U.S.C. 154(b) by 28 days.

(21) Appl. No.: 17/930,811

(22) Filed: Sep. 9, 2022

(65) Prior Publication Data
US 2023/0089528 A1  Mar. 23, 2023

(30) Foreign Application Priority Data
Sep. 14, 2021 (EP) .................................... 21196682

(51) Int. Cl.
*G06F 9/445* (2018.01)
*G06F 9/48* (2006.01)
*G06F 9/54* (2006.01)

(52) U.S. Cl.
CPC ........ *G06F 9/44505* (2013.01); *G06F 9/4887* (2013.01); *G06F 9/546* (2013.01)

(58) Field of Classification Search
CPC ..... G06F 9/44505; G06F 9/4887; G06F 9/546
See application file for complete search history.

(56) References Cited

U.S. PATENT DOCUMENTS

| | | | |
|---|---|---|---|
| 9,946,568 B1* | 4/2018 | Ismael | G06F 9/5027 |
| 10,789,189 B1* | 9/2020 | Balle | G06F 9/546 |
| 2010/0023939 A1* | 1/2010 | Takahashi | G06F 9/45537 718/1 |
| 2014/0250436 A1* | 9/2014 | Tang | G06F 9/466 718/1 |
| 2017/0242472 A1* | 8/2017 | Morad | G06F 1/3206 |

(Continued)

OTHER PUBLICATIONS

Groesbrink, Stefan, "Adaptive Virtual Machine Scheduling and Migration for Embedded Real-Time Systems", Jan. 2015, XP055870756, Retrieved from the Internet, URL:https://d-nb.info/1072146274.34 (247 pages).

(Continued)

*Primary Examiner* — Aurel Prifti
(74) *Attorney, Agent, or Firm* — Eversheds Sutherland (US) LLP

(57) ABSTRACT

A method to execute a mode-transition in a multi-mode computer system from a current to a future mode during run-time of the computer system, wherein the computer system comprises hosts with processing cores. A mode-transition is determined by a transition definition, wherein all transition definitions form a set of transition definitions, and wherein a transition definition between two defined modes comprises a reference to the initial mode, a reference to the future mode, and a list of specific actions to be executed during the mode-transition. A first function runs on a host of the hosts. A second function runs on a processing core of the hosts. Third functions are provided, wherein a third function is running on a processing core in each of the hosts of the computer system. Fourth functions are provided, wherein on each processing core of the computer system a fourth function is running.

16 Claims, 4 Drawing Sheets

(56) References Cited

U.S. PATENT DOCUMENTS

| | | | | |
|---|---|---|---|---|
| 2017/0242738 A1* | 8/2017 | Steiner | ............... | G06F 9/546 |
| 2019/0235567 A1* | 8/2019 | Louvat | ............... | G06F 1/3203 |
| 2019/0287205 A1* | 9/2019 | Ramadoss | ............... | G06F 9/4881 |
| 2019/0377560 A1* | 12/2019 | Papageorgiou | ............... | G06F 8/4443 |
| 2021/0026701 A1* | 1/2021 | Hamann | ............... | G06F 9/4887 |
| 2021/0081216 A1* | 3/2021 | Komarov | ............... | H04L 9/3239 |
| 2021/0103480 A1* | 4/2021 | Story | ............... | G06F 9/5055 |
| 2022/0283789 A1* | 9/2022 | Yadhav | ............... | H04L 67/34 |

OTHER PUBLICATIONS

Li, Haoran, "Multi-Mode Virtualization for soft Real-Time Systems", 2018 IEEE Real-Time and Embedded Technology and Applications Symposium (12 pages).

Extended European Search Report of corresponding European Application No. 21196682.5 dated Mar. 14, 2022. (14 pages).

* cited by examiner

METHOD TO EXECUTE A MODE-TRANSITION IN A MULTI-MODE COMPUTER SYSTEM

CROSS-REFERENCE TO RELATED APPLICATIONS

This application claims priority to and the benefit of European Application No. 21196682.5, filed Sep. 14, 2021, which is hereby incorporated by reference herein in its entirety.

FIELD

The invention relates to a method to execute a mode-transition in a multi-mode computer system, in particular in a multi-mode automotive computer system, from a current mode to a future mode of a set of defined modes during run-time of the computer system, wherein
said computer system is running in a current, active mode, and wherein
said computer system comprises a set of two or more processing cores, and wherein
said computer system comprises one host, which host comprises said set of processing cores, or wherein
said computer system comprises two or more hosts, wherein each of said hosts comprises one or more of said set of processing cores,
and wherein each processing core in said set of processing cores is configured to run one or more software components of a set of defined software components, and wherein a set of two or more modes is provided.

Furthermore the invention relates to a computer system comprising a set of two or more processing cores, wherein said computer system comprises one host, which host comprises said set of processing cores, or wherein said computer system comprises two or more hosts, wherein each of said hosts comprises one or more of said set of processing cores, and wherein each processing core in said set of processing cores is configured to run one or more software components of a set of defined software components, and wherein a set of two or more modes is provided.

BACKGROUND

Automotive systems have significantly evolved in the last decades. Modern automotive systems may comprise complex computer systems often including multiple hosts, which may comprise multiple processing cores, interconnected via communication networks, like Ethernet or PCIe. In some cases, automotive computer systems may include dedicated processing cores like graphic processing units, GPU, or deep neural network, DNN, engines, as well as general-purpose processing cores. In other cases, automotive computer systems may comprise virtualize resources, like virtual processing cores or virtual network components.

Computer systems may comprise run-time systems providing an execution environment for software components, like operating systems or software platforms. Operating systems may run on either physical or virtualized processing cores and provide methods to, among others, access hardware components. Software platforms, including middleware and protocol stacks, may provide additional services to software components to perform certain operations, like those related to the synchronization of tasks, error handling, monitoring, communication, or configuration. In other cases, software components may be developed to run without the support of run-time systems, so called bare-metal software.

Automotive systems generally comprise a repertory of critical and non-critical functions, among which those comprised in the so-called Advanced Driver Assistance Systems, ADAS, in modern automotive systems may require the execution of a large number of software components. ADAS functions include, for example, a plurality of autonomous driving features, like lane centering assistance, LCA, collision avoidance system, CAS, traffic sign recognition, TSR, or autopilot.

Software components, fully or partially implementing those functions, may run simultaneously in one or multiple of said processing cores, within a single host or distributed among multiple hosts. Besides core processing time, some software components may fully or partially utilize other resources in the automotive system, like network bandwidth or memory, which may be limited due to hardware construction.

The amount of automotive functions that an automotive platform can execute may be limited in an automotive system by the availability of resources, and, particularly, the availability of hardware components. The development of new hardware components allowing to design automotive systems capable to execute a larger number of software components may not scale as fast as the market demands to develop and deploy new automotive functions, which may exceed the resource limits of existing automotive systems. However, not all automotive functions comprised in an automotive system may always need to run. For example, an automatic parking system function, APS, may not be required to perform its job while the automotive system is operated on a motorway, whereas the adaptive cruise control function, ACC, may not be required while parking. Moreover, in some cases, an automotive function may require different amounts of resources depending on the operational situation. For example, a navigation system may require more memory and rendering resources to display a navigation map while driving through a dense metropolitan area than while doing so along a desert road.

Therefore, it is desirable to configure an automotive system to adapt the set of active, running, automotive functions based on defined circumstances that arise during operation, allowing one or more software components to remain inactive, not running, at selected point in time. Inactive software components may need to be (re)initialized prior to restoring operation to acquire, or register, the resources they need to run, while active software components may need to be de-initialized to release, or unregister, resources while being inactive. One means to do so is to define a plurality of so-called modes, representing operation use-cases, wherein each mode comprises a subset of the set of automotive functions required to run when defined operation conditions are met. For example, one such mode may correspond to motorway driving, while others may correspond to urban driving, parking, off-road driving, or traffic jam driving.

An automotive system comprising multiple modes may need to manage the activation of those modes during operation ensuring that the transition between modes is carried in a coordinated manned between all hosts and processing cores, for example, guaranteeing the necessary resources for each running software component and the right timing while performing the transition. Uncontrolled mode transitions may have catastrophic consequences, especially if anyone of the involved automotive functions performs critical tasks.

Therefore, it is desirable to have mechanisms to switch between modes and coordinate the execution of related software components in a controlled and safe manner.

SUMMARY

It is an objective of the invention to provide a method to configure multiple modes in a multi-host and/or multi-core automotive system, whereby each said modes comprises a subset of a set of software components, fully or partially implementing automotive functions. It is also an objective of the invention to provide a method to perform the transition between said modes during operation in a controlled and safe manner.

This objective is achieved with a method and a computer system described above, wherein each mode of said set of modes comprises a unique mode identifier, MODE ID, for example an index in a defined table of modes, or a memory pointer, or a unique name identifying the mode, or the result of a hash function, or an arbitrary reference globally and unambiguously identify the mode, and a set of references to software components from the set of defined software components, wherein when a mode is active, all listed software components of said mode are running in one or more processing cores of the set of processing cores of the computer system, and wherein only one mode from the defined set of modes can be active in said computer system at a time, and wherein the mode-transition, that is the transition from the current, active mode to a future defined mode, is executed at runtime, during operation, of the computer system, wherein a mode-transition is determined by a transition definition, wherein for each allowed mode-transition a transition definition is provided, wherein all transition definitions form a set of transition definitions, and wherein a transition definition between two defined modes comprises a reference to the initial mode a reference to the future mode a list of specific actions to be executed during the mode-transition, wherein said list of specific actions comprises information of necessary steps to execute said mode-transition, such as de-initialize a software component of the set of software components in the current, old, mode, and/or un-register resources, like memory, hardware devices, or software services, not anymore required in the future, new, mode, and/or initialize a software component of the set of software components in the new mode, register resources, like memory, hardware devices, or software services, required by software components in the new mode, and/or (re)configure the runtime system of one or multiple processing cores to run the set of software components in the new mode, and/or reconfigure software services like error handlers, monitoring systems, watchdogs, and/or middleware, to the new set of software components in the new mode, wherein each specific action may comprise instructions, including system calls provided by an operating system or the software platform, hyper-calls provided by a hypervisor, and/or instructions to directly operate on bare-metal, which need to be executed in one or multiple of said hosts to perform the defined action, and wherein each action in said list of specific actions, in particular additionally, may comprise a defined time-budget for said action to be completed during runtime, and wherein, said transition definition additionally comprises one or more optional points in time, relative to the runtime of the software components in the old mode, when the mode-transition can be initiated, and wherein said set of transition definitions and said set of modes are available to all processing cores in said set of processing cores, for example by either storing a full or partial copy in a memory space related to each processing core in the set of processing cores, or storing a full or partial copy in a memory space related to each host in the set of hosts, said memory space being accessible among all processing cores related to said host, or storing a full or partial copy in a central memory space, whereby access to said memory space is possible from all processing cores in the set of processing cores, or encoding said set of transition definitions with instructions in all, or a subset, of the hosts and processing cores, whereby said instructions are sufficient to extract the information of said set of transition definitions and make it available to all processing cores in the set of processing cores, wherein (1) a first function, the so-called function "CustomModeHandler", is provided, which first function is running on a host of the hosts of the computer system, wherein said first function (a) receives a request to execute a transition from a current, active mode to a defined future mode, the "new" mode, for example by means of a human-machine interface or as a result of an automated algorithm, and (b) after receiving said request selects the transition definition from said set of transition definitions for said mode-transition, said transition definition defining the mode-transition from the actual active mode to the future, new mode, and wherein said first function computes, based on said transition definition, a point in time in the future, the "activation point in time", at which activation point in time said new mode shall become active, and wherein said computation takes into account one of said optional points in time in the transition definition, or a globally defined relative point in time for the initiation of the transition, like a point in time at the end of a schedule cycle (hypercycle), or a point in time at the end of a predefined interval, or the immediately next possible point in time after the reception of said request, or a point in time according to a defined static assignment of transition points in time, for example, a timetable, or the result of a dynamic algorithm assessing the current runtime status of the system, including safety considerations, operational metrics, and/or historical data, or a point in time optionally received alongside said request to execute a transition, (2) a second function, the so-called function "ModeSwitchManager", is running on a processing core of the hosts in the computer system, and wherein the first function transmits a message, the so-called m0-message, to said second function, wherein said m0-message comprises
a reference to the new mode, and
the computed activation point in time,
(3) third functions, the so-called "ModeSwitchExecutor" functions, are provided, wherein a third function is running on a processing core in each of the hosts of the computer system,
and wherein the second function, after receiving the m0-message, propagates the information of said m0-message via messages, the so-called m1-messages, to third functions or to each of said third functions, wherein each m1-message is a MODE REQUEST message comprising
the received reference to the new mode, and
the activation point in time in the future of the new mode, and wherein
third functions receive an m1-message requesting a mode-transition in the processing cores of its related hosts, wherein
(4) fourth functions, the "Scheduler" functions, are provided, wherein on each processing core of the computer system a fourth function is running, and wherein
third functions, after receiving the m1-message, distribute the information of said m1-message to fourth functions running on a processing core comprised in the host related to said third functions via a message or messages, the so-called m2-message(s), wherein each m2-message is a REQUEST message including
the received reference to the new mode
as well as the activation point time for the new mode, and wherein
fourth functions extract, after receiving an m2-message, the reference to the new mode and the activation point in time from the received m2-messages and compute the necessary changes in the configuration of the processing core in which said fourth function is running, so that the software components, which have to run on the processing core according to the new mode can be activated, and wherein
said computation of changes in the configuration is based on
the current runtime state of the processing core, and
the characteristics of the runtime system of the processing core, like its operating system, scheduling policy or task dispatching mechanism, hypervisor or virtualization layers, or characteristics related to the runtime configuration of software components and resources, and
the new and old modes,
and wherein said computed changes in the configuration comprise
the execution of a list of specific actions according to said transition definition, and
the time-budget for each of said defined specific action, and
and wherein
said fourth functions execute at the activation point in time said changes in the configuration, so that the new mode is activated.

Advantageous embodiments of the method and the computer system according to the invention described above are detailed hereinafter, wherein said embodiments may be realized alone or in any arbitrary combination:

It may be provided that (1) each fourth function, after receiving the m2 message from the third function, additionally performs local checks on its processing core to assess if the configuration changes on the processing core configuration according to the new mode can be performed, in particular safely performed, for example in compliance with safety functional requirements, and/or
timely performed, for example with consideration to said computed time and/or said defined time-budget for said list of specific actions, and
sends a so-called m3 message to the third function which is the source of the m2 message, wherein each particular fourth function sends the m3 message to the third function sourcing said m2 message, wherein
said m3 message is a NEGATIVE ACKNOWLEDGMENT message, if the changes cannot be performed, and said fourth function finishes the mode transition without performing configuration changes,
or
said m3 message is a POSITIVE ACKNOWLEDGMENT message if the changes can be performed, and subsequently (2) in the case that the m3 message is a POSITIVE ACKNOWLEDGMENT message, said fourth functions wait for the reception of a follow up message, the so-called m6-message, from said third functions, wherein
if said received m6-message is a PREPARE message, said fourth functions execute the following steps:
(i) computing the necessary changes on the processing core configuration of the processing core on which the fourth function is running, so that the software components of the new mode can be activated when said configuration is applied, and subsequently
(ii) sending a message, the so-called m7-message, to the third function which is the source of the m6-message, wherein
(ii.1) said m7-message is a READY message indicating the readiness of said fourth function to apply said configuration changes of the processing core, and subsequently
(iii) waiting for the reception of a follow up messages, the so-called m10-message, from said third function, wherein
(iv) if said m10-message is an ACTIVATION message, activating said configuration changes and finalize said mode change transition, or
(v) if said m10-message is a REJECT message, finalize said mode change transition without applying said configuration changes, or
(ii.2) said m7-message is a REJECT message indicating said fourth function cannot apply said configuration changes of the processing core, so that said fourth function finishes the mode transition without executing configuration changes,
or
if said m6-message is a REJECT message, finalizes the mode transition without executing any configuration changes,
and wherein (3) said third functions, after sending the m2-messages to the fourth functions, wait for m3-messages (m3_1 ... m3_n) from their corresponding fourth functions running on each processing core, and, after receiving said m3-messages from their corresponding fourth functions communicate a new message, the so-called m4-message, to the second function, which is the source of the m1-message, and wherein
said m4-message is a NEGATIVE ACKNOWLEDGMENT message, if at least one of said m3-messages is a NEGATIVE ACKNOWLEDGMENT message, and said third function finishes the mode transition without executing configuration changes, or said m4-message is a POSITIVE ACKNOWLEDGMENT message, if all said m3-messages are POSITIVE ACKNOWLEDGMENT messages, and subsequently
  (i) said third functions wait for a message, the so-called m5-message, from the second function and propagate said m5-message or the content of said m5-message to its fourth functions, via the so called m6-message, and
    (i.1) if said m5-message is a REJECT message, said m6-message is a REJECT message, and said third function finishes the mode transition without executing configuration changes, or
    (i.2) if said m5-message is a PREPARE message, said m6-message is a PREPARE message, and subsequently executes the steps of:
  (ii) waiting for messages, the so-called m7-messages (m7_1 ... m7_n) from the fourth functions running on each related processing core and subsequently communicate a new message, the so-called m8-message, to the second function, which is the source of the m5-message, and
    (ii.1) if any of said m7-messages is a REJECT message, said m8-message is a REJECT message, and said third function finishes the mode transition without executing configuration changes, or
    (ii.2) if said m7-messages are all READY messages, said m8-message is a READY message, and executes the steps of:
  (iii) wait for a message, the so-called m9-message, from the second function, and after receiving said m9-message propagate said m9-message or the content of said m9-message to the fourth functions with a message, the so-called m10-message, and
    (iii.1) if said m9-message is an ACTIVATE message, said m10-messages are ACTIVATE messages, or
    (iii.2) if said m9-message is a REJECT message, said m10-messages are REJECT messages, and said third function finishes the mode transition without executing configuration changes,
and wherein
(4) said second function, after sending the m1-messages to the third functions, waits for m4-messages (m4_1 ... m4_n) from the third functions running on each host, and after receiving said m4-messages communicate a m5-message to said third functions, and wherein,
  if (a) said m4-messages (m4_1 ... m4_n) comprise a message of each host, and (b) each of said m4-messages (m4_1 ... m4_n) is a POSITIVE ACKNOWLEDGMENT message, said m5-message is a PREPARE message, and subsequently,
  (i) said second function waits for messages, the so-called m8-message (m8_i), from the third functions running on each host (host_i), and, after receiving m8-messages from said third functions, communicate a new message, a so-called m9-message (m9), to said third functions, wherein
    (i.1) if said m8-messages (m8_1 ... m8_n) comprise an m8-message of each third function, and if all said m8-messages are READY messages, said m9-message is a ACTIVATE message, or otherwise
    (i.2) said m9-message is a REJECT message,
or
otherwise, if (a) and/or (b) are not fulfilled, said m5-message is a REJECT message and the mode transition is terminated without performing configuration changes.

It may be provided that the configuration changes computed by one or more of said fourth functions include the modification of a time-triggered schedule, for example a schedule table, wherein said modifications are based on
  a precomputed offline time-triggered schedule, wherein all software components in the set of software components of said new mode are included, or
  an online computed time-triggered schedule, wherein all software components in the set of software components of said new mode are included, or
  either a precomputed or online generated incremental time-triggered schedule, wherein said incremental time-triggered schedule comprises a set of necessary modifications to the actual time-triggered schedule to adapt to the changes between the set of software components of said old mode and the sets of software components of said new mode.

It may be provided that said first, second, third and/or fourth function initiate timeout counters after sending anyone of said messages m0 ... m10, and wherein said counters are initialized with defined time intervals, wherein said counters decrease with the progression of time, and wherein said first, second, third, and/or fourth functions limit the waiting time for messages to the time until said counter timeout expires, and wherein if no message is received within said timeout interval said function(s) is(are) terminated without performing configuration changes.

It may be provided that at least one, preferably all functions of the first, second, and third function are replicated, wherein each function sending a message to a replicated function sends a replicated message to each replica of said replicated function, and wherein each function receiving a message from a replicated function receives a replicated message from each replica of said replicated function, and wherein replicated messages are collected by the receiving function and compressed to appear as a single message applying a defined criterion, wherein said defined criterion is for example
  selecting the highest priority replica among a defined priority of preference for said replicated messages, or
  implementing a voting mechanism among said replicated messages, or
  selecting one among said replicated messages based on the reception order, for example the first one.

It may be provided that if the transition definition of a mode-transition definition does not require configuration changes to one or more so-called "unaffected" processing cores of said set of processing cores in the system, the fourth functions of said unaffected processing cores are excluded from said mode-transition, for example by not participating in the exchange of any of said messages, m0 ... m10-messages, with the related third functions in the related host.

In this case, the fourth functions of said unaffected processing cores do not need to apply any configuration changes to said processing cores, for example if the list of software components of the old and new mode are identical for the related processing core none of the specific actions in the list of specific actions of said transition-definition relates to said processing cores, so that these fourth functions are excluded from the specific mode transition.

It may be provided that if the transition definition of a mode-transition definition does not require configuration changes to one or more so-called "unaffected hosts" of said set of hosts in the system, so that said third functions are excluded from said mode-transition, for example by not participating in the exchange of any of said messages, m0 . . . m10-messages, with the related second functions in said computer system.

All of the fourth functions of the processing cores in said unaffected hosts do not need to apply any configuration changes to said processing cores, for example if the list of software components of the old and new mode are identical for all the related processing cores and none of the specific actions in the list of specific actions of said transition-definition relates to said processing cores.

It may be provided that said first, second, third, and/or fourth functions are implemented in software components, for example with an individual software component for each function, as part of an already existing software component, or in a software component implementing all said functions related to a processing core, wherein said software components are included in the set of software components in the computer system, and wherein at least one or more of said software components are included in the set of software components for each transition definition in said computer system.

It may be provided that said first, second, third, and/or fourth functions are implemented as one or more operating system services, software libraries, middleware, or hypervisor services and/or said first, second, third, and/or fourth functions are implemented as hardware, for example in an FPGA or ASIC component in said computer system, or firmware, for example as an embedded program for a micro-controller in said computer system.

It may be provided that at least one, or more, of said messages, m0 . . . m10-messages, are transmitted by means of inter-host communication, like on-chip or off-chip network, or by means of intra-host communication mechanisms, like IPC (inter-process communication) if the computer system is a POSIX computer systems, or RTE communication (Run-Time Environment communication) if the computer system is an AUTOSAR computer systems.

It may be provided that said computer system additionally comprises a communication network, wherein said communication network comprises end nodes and/or starcouplers, like bridges, switches, or routers, and/or communication buses, and wherein each of said one or more hosts in said computer system is comprised in one of said end nodes or starcouplers, and wherein said communication network is configured to transport said messages, m0 . . . m10 messages, between the respective sender and receivers of said functions, and wherein said configuration of said communication network comprises configuration related to said end nodes and/or starcouplers, and/or communication buses, and wherein the configuration changes computed by one or more of said fourth functions include changes to said configuration of said communication network.

It may be provided that said communication network is a time-triggered communication network, wherein said modifications of said configuration of said time-triggered communication network are based on
 a precomputed offline time-triggered communication schedule, wherein all or a subset of the communications between the software components of said new mode are included, or
 an online computed time-triggered communication schedule, wherein all or a subset of the communications between the software components in the set of software components of said new mode are included, or
 either a precomputed or online generated incremental time-triggered communication schedule, wherein said incremental time-triggered schedule comprises the necessary modifications to the actual time-triggered communication schedule for the communications between the software components in the set of software components of said new mode.

It may be provided that the computer system comprises a hypervisor, wherein
 one, or more, of said processing cores in said computer system is a virtual processing core, and/or
 one, or more, of said hosts in said computer system is a virtual host, and/or
 part of said communication network is a virtual network.

An advantage of the invention with respect to prior art lies in the distributed nature of the method, wherein a decision to transition to a new mode is propagated to a plurality of hosts and processing cores in the automotive system and executed in a coordinated manner Another advantage of the invention with respect to prior art lies in the deterministic behavior of the method, wherein the definition of modes and mode transitions of the method allows the offline computation of worst-case transition times, and therefore include these times in system safety and timing analysis.

Another advantage of the invention with respect to prior art lies in the possibility to check the timely behavior of a transition process, wherein the timing information included in the definition of mode transitions and its worst-case transition time allows to monitor its correct progression and detect ill-timed behavior.

Another advantage of the invention with respect to prior art lies in the possibility to replicate all, or parts, of the functions implementing the method, wherein said replication of functions may increase the safety compliance of the automotive system.

Another advantage of the invention with respect to prior art lies in the possibility to limit the processing and communication overhead by excluding processing cores, and/or hosts, of the automotive system from the mode transition process, when the configuration of said processing cores, and/or said hosts, are not affected by said mode transition.

Another advantage of the invention with respect to prior art lies in the freedom to implement said functions as one or more operating system services, as software libraries, as middleware, or as hypervisor services, wherein said function implementation may be fully or partially done in software, hardware, or firmware, or a mix of those.

BRIEF DESCRIPTION OF FIGURES

In the following, in order to further demonstrate the present invention, illustrative and non-restrictive embodiments are discussed, as shown in the drawings. In the drawings

DETAILED DESCRIPTION

Figure 1:
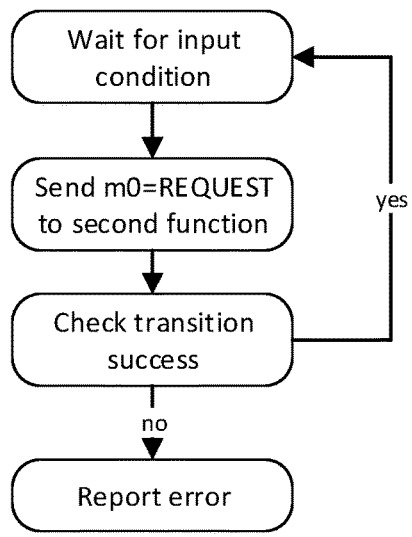
FIG. 1 depicts an example workflow of a first function according to the invention.

In the following a method and a computer system implementing the method according to the invention is described based on an example which is not limiting the scope of protection of the invention.

The invention relates to a method to transition between an old mode and a new mode of a set of defined modes in a computer system, in particular in an automotive computer system (in the following the terms computer system, automotive computer system and automotive system will be used synonymously), wherein each of said modes defines a set of one or more software components of a set of defined software components, and wherein said set of one or more software components of said new mode is executed in said automotive computer system when said transition to said new mode is executed, The method takes as input
a characterization of the automotive system,
a set of software components, which may be executed in the automotive system,
a set of mode definitions,
a set of mode transition definitions.

Automotive System

The invention relates to an automotive computer system characterized as a computer system comprising one or more hosts, wherein each host comprises one or multiple processing cores, and wherein said processing cores are configured to run one or more software components of a set of defined software components. The set of hosts in the automotive computer system may include general purpose processing units, CPU, or dedicated processing units, like graphical processing units, GPU, or deep neural network, DNN, engines. Additionally, the automotive computer system may comprise other hardware components, like memory, storage units, or networking interfaces, as well as FPGA or ASIC components, partly or fully implementing one or more of the functionalities provided by said software components.

The computer system may allow the exchange of messages between software components via inter-host communication mechanisms, for example IPC (inter-process communication) if the computer system is a POSIX computer systems, or RTE communication (Run-Time Environment communication) if the computer system is an AUTOSAR computer systems.

It may be provided that the automotive computer system additionally comprises one or more communication networks, for example time-triggered communication networks, wherein said communication networks comprise end nodes and/or starcouplers, like bridges, switches, or routers, and/or communication buses. It may also be provided that two, more, or all of said hosts in said automotive computer system are an end node in said communication network, and that said communication network is configured to transport messages between a sender node and one or more receiver nodes, for example directly via said communication buses, or for example via one or more of said starcouplers.

The computer system may provide a so called bare-metal environment for the execution of software components, or the computer system may provide an operating system, for example a POSIX compliant operating system, and/or a software service platform, like the AUTOSAR classic or Adaptive AUTOSAR platforms. Operating systems and software platforms may provide services to software components, typically in the form of system calls, which abstract software operations, for example those related to the interaction with hardware components, like memory, storage devices, or other input/output interfaces.

It may be provided that a plurality of operating systems and/or software platforms are provided in the automotive computer system, wherein each host may provide one or multiple operating systems and/or one or multiple software platforms and/or provide a bare-metal environment.

The computer system may additionally comprise virtualization mechanisms abstracting hardware resources, like hosts, processing cores, and network components. Virtualization mechanisms are typically implemented using a mixture of hardware and software, or purely in software, and they provide a virtual environment, or virtual machine, wherein software components may execute in similar conditions as if they would execute directly running in the abstracted hardware components. Virtual machines may emulate computer systems comprising components, like hosts and processing cores, differing in number and/or characteristics from those present in the original hardware components. Typical virtualization mechanisms are hypervisors and containers.

It may be provided that the automotive computer system comprises a virtualization layer, or hypervisor, wherein said virtualization layer is implemented in hardware and/or software, whereby one, or more, of said processing cores in said computer system is a virtual processing core, and/or one, or more, of said hosts in said computer system is a virtual host, and/or part, or all, of said communication network is a virtual network.

Mode Definition

A mode is characterized by a so-called mode definition, comprising information describing the software components that are active when the mode is selected. Said information includes
a unique mode identifier, MODE ID, for example an index in a defined table of modes, or a memory pointer, or a unique name identifying the mode, or the result of a hash function, or an arbitrary reference globally and unambiguously identify the mode, and
a set of references to software components from the set of defined software components, wherein when a mode is active, all listed software components of said mode are running in one or more processing cores of the set of processing cores of the computer system.

Mode Transition Definition

The invention relates to a multi-mode automotive computer system wherein (exactly) one mode, the active mode, may be active at any given time, and wherein switching to a new mode implies de-activating the current active mode and activating the new future mode. This transitions between any two modes may or may not be allowed depending on a defined set of mode transition definitions, wherein for each allowed mode transition a transition definition is provided.

A transition definition comprises information including
a reference to the initial mode, which is the active mode before applying the transition,
a future mode, to which will be the active mode after applying the transition,
a list of specific actions, which need to be executed during the transition to perform the transition from the set of software components in the past active mode to the set of software components in the future active mode.

List of Specific Actions

The invention relates to a method wherein a list of specific actions in a mode transition definition comprises information of necessary steps that need to be executed to fulfill said transition. The concrete specific actions may depend on specific characteristics of the automotive computer system, like the number of hosts and cores, the number and type of hardware resources, like memory, storage units, or input/output interfaces, and may include the following actions
de-initialize a software component of the set of software components in the current, old, mode, and/or un-register resources, like memory, hardware devices, or software services, not anymore required in the future, new, mode, and/or initialize a software component of the set of software components in the new mode, register resources, like memory, hardware devices, or software services, required by software components in the new mode, and/or (re)configure the runtime system of one or multiple processing cores to execute the set of software components in the new mode, and/or (re)configure software services like error handlers, monitoring systems, watchdogs, and/or middleware, to the new set of software components in the new mode, wherein each specific action may comprise instructions, including system calls provided by an operating system or the software platform, hyper-calls provided by a hypervisor, and/or instructions to directly operate on bare-metal, which need to be executed in one or multiple of said hosts to perform the defined action.

Furthermore, each action in said list of specific actions may additionally comprise a defined time-budget for said action to be completed during runtime, wherein said defined time-budget allows analyzing offline the worst-case time to execute said mode transition as well as monitoring at run-time the timely progression of the defined actions.

Furthermore, said transition definition may additionally comprise one or more optional points in time, relative to the runtime of the software components in the old mode, when the mode-transition may be initiated, wherein the point in time when the mode transition may be initiated may be calculated offline or at runtime based on the planning of the execution of software components, for example based on a time-triggered schedule, or defined properties of the set of software components, like the hyperperiod of periodic software components.

It may be provided that said set of transition definitions are available to all processing cores in said set of processing cores, for example by either storing a full or partial copy in a memory space related to each processing core in the set of processing cores, or storing a full or partial copy in a memory space related to each host in the set of hosts, said memory space being accessible among all processing cores related to said host, or storing a full or partial copy in a central memory space, whereby access to said memory space is possible from all processing cores in the set of processing cores, or encoding said set of transition definitions with instructions in all, or a subset, of the hosts and processing cores, whereby said instructions are sufficient to extract the information of said set of transition definitions and make it available to all processing cores in the set of processing cores.

First, Second, Third, Fourth Functions

The invention relates to a method providing functions, including first, second, third, and fourth functions, running on one or more processing cores of the computer system, to execute the mode transition at runtime, wherein said first, second, third, and fourth functions communicate via the exchange of messages, m0- to m10-messages, wherein said messages may provide a positive type and a negative type, m3- to m10-messages, or may provide a single positive type, m0- to m2-messages, as summarized in Table 1.

TABLE 1

Summary of messages and their types

| Message | Type (positive) | Type (negative) |
|---|---|---|
| m0-message | REQUEST | N/A |
| m1-message | REQUEST | N/A |
| m2-message | REQUEST | N/A |
| m3-message | POSITIVE ACKNOWLEDGMENT (PACK) | NEGATIVE ACKNOWLEDGMENT (NACK) |
| m4-message | POSITIVE ACKNOWLEDGMENT (PACK) | NEGATIVE ACKNOWLEDGMENT (NACK) |
| m5-message | PREPARE | REJECT |
| m6-message | PREPARE | REJECT |
| m7-message | READY | REJECT |
| m8-message | READY | REJECT |
| m9-message | ACTIVATE | REJECT |
| m10-message | ACTIVATE | REJECT |

First functions, customModeHandler, may receive a request to execute a transition from a current mode to a new mode, for example by means of a human-machine interface, or as a result of an automated algorithm, as illustrated in the example workflow depicted in FIG. 1. After receiving said request, said first function selects the corresponding transition definition of the set of transition definitions and computes a point in time when said mode shall become active, for example by computing a point in time based on one of said defined optional points in time in the transition definition, or a globally defined relative point in time for the initiation of the transition, like a point in time at the end of a schedule cycle (hypercycle), or a point in time at the end of a predefined interval, or the immediately next possible point in time after the reception of said request, or a point in time according to a defined static assignment of transition points in time, for example, a timetable, or the result of a dynamic algorithm assessing the current runtime status of the system, including safety considerations, operational metrics, and/or historical data, or a point in time optionally received alongside said request to execute a transition.

The transition request and computed point in time is then communicated to second functions, with the transmission of an m0-message.

It may be provided that first functions after sending said request additionally perform a check to confirm whether the transition has been successful and perform mitigation actions if not, for example report an error.

Figure 2:
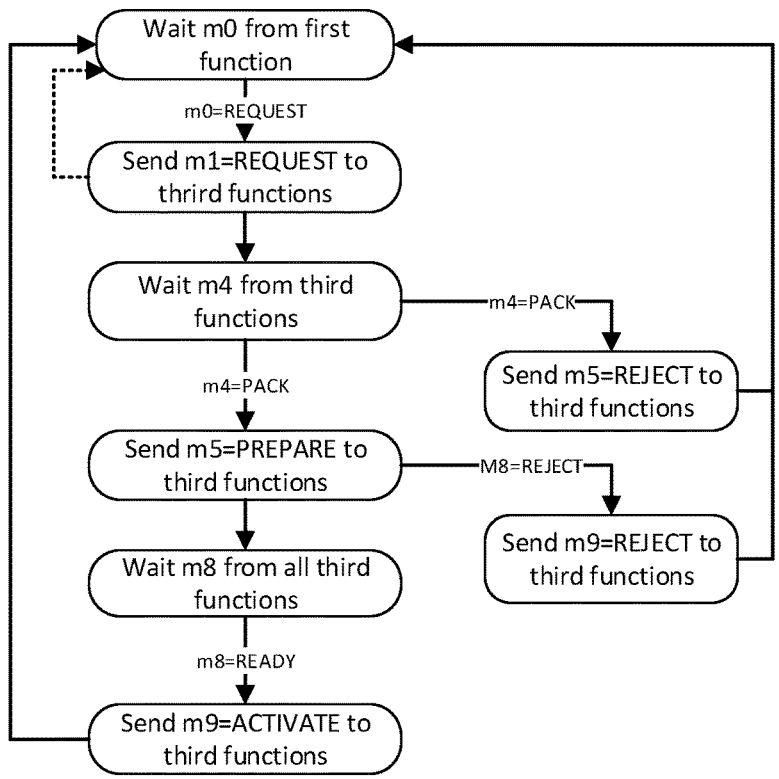
FIG. 2 depicts an example workflow of a second function according to the invention.

Second functions, ModeSwitchManager, may receive a request to execute a transition from a current mode to a new mode from said first functions via the reception of an m0-message, as illustrated in the workflow depicted in FIG. 2, wherein an m0-message comprises a reference to the new mode, and the computed activation point in time, wherein, after receiving the m0-message, the second functions propagate the information of said m0-message to third functions via m1-messages.

It may be provided that second functions after sending the m1-messages to the third functions, wait for m4-messages (m4_1 . . . m4_n) from the third functions running on each host, and after receiving said m4-messages communicate a m5-message to said third functions, and wherein, if (a) said m4-messages (m4_1 . . . m4_n) comprise a message of each host, and (b) each of said m4-messages (m4_1 ... m4_n) is a POSITIVE ACKNOWL-
EDGMENT message, said m5-message is a PREPARE
message, and subsequently,
(i) said second function waits for messages, the so-called
m8-message (m8_i), from the third functions running
on each host (host_i), and, after receiving m8-messages
from said third functions, communicate a new message,
a so-called m9-message (m9), to said third functions,
wherein
(i.1) if said m8-messages (m8_1 ... m8_n) comprise an
m8-message of each third function, and if all said
m8-messages are READY messages, said m9-mes-
sage is a ACTIVATE message, or otherwise
(i.2) said m9-message is a REJECT message,
or
otherwise, if (a) and/or (b) are not fulfilled, said m5-mes-
sage is a REJECT message and the mode transition is
terminated without performing configuration changes.

Figure 3:
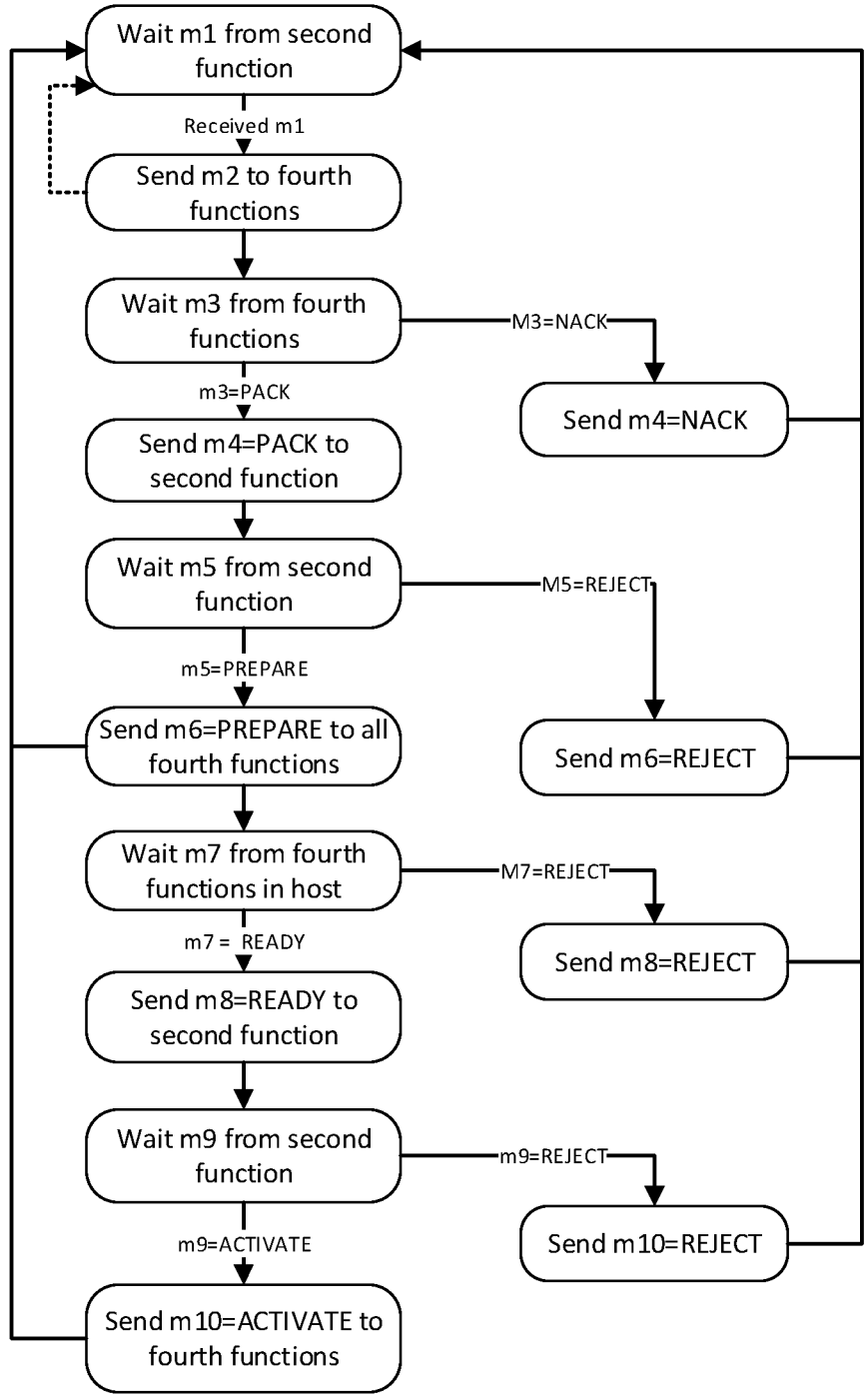
FIG. 3 depicts an example workflow of a third function according to the invention.

Third functions, ModeSwitchExecutor, may receive a request to execute a transition from a current mode to a new mode from said second functions via the reception of an m1-message, as illustrated in the workflow depicted in FIG. 3. An m1-message comprises
the received reference to the new mode, and
the activation point in time in the future of the new mode,
and wherein, after receiving the m1-message, the second functions propagate the information of said m1-message to fourth functions via m2-messages.

It may be provided that third functions, additionally wait for m3-messages (m3_1 ... m3_n) from their corresponding fourth functions running on each processing core, and, after receiving said m3-messages from their corresponding fourth functions communicate a new message, the so-called m4-message, to the second function, which is the source of the m1-message, and wherein
said m4-message is a NEGATIVE ACKNOWLEDG-
MENT message, if at least one of said m3-messages is
a NEGATIVE ACKNOWLEDGMENT message, and
said third function finishes the mode transition without
executing configuration changes, or
said m4-message is a POSITIVE ACKNOWLEDG-
MENT message, if all said m3-messages are POSI-
TIVE ACKNOWLEDGMENT messages, and subse-
quently
(i) said third functions wait for a message, the so-called
m5-message, from the second function and propa-
gate said m5-message or the content of said m5-mes-
sage to its fourth functions, via the so called m6-mes-
sage, and
(i.1) if said m5-message is a REJECT message, said
m6-message is a REJECT message, and said third
function finishes the mode transition without
executing configuration changes, or
(i.2) if said m5-message is a PREPARE message,
said m6-message is a PREPARE message, and
subsequently executes the steps of:
(ii) waiting for messages, the so-called m7-messages
(m7_1 ... m7_n) from the fourth functions running
on each related processing core and subsequently
communicate a new message, the so-called m8-mes-
sage, to the second function, which is the source of
the m5-message, and
(ii.1) if any of said m7-messages is a REJECT
message, said m8-message is a REJECT message,
and said third function finishes the mode transition
without executing configuration changes, or
(ii.2) if said m7-messages are all READY messages,
said m8-message is a READY message, and
executes the steps of:
(iii) wait for a message, the so-called m9-message,
from the second function, and after receiving said
m9-message propagate said m9-message or the con-
tent of said m9-message to the fourth functions with
a message, the so-called m10-message, and
(iii.1) if said m9-message is an ACTIVATE message,
said m10-messages are ACTIVATE messages, or
(iii.2) if said m9-message is a REJECT message, said
m10-messages are REJECT messages, and said
third function finishes the mode transition without
executing configuration changes.

Figure 4:
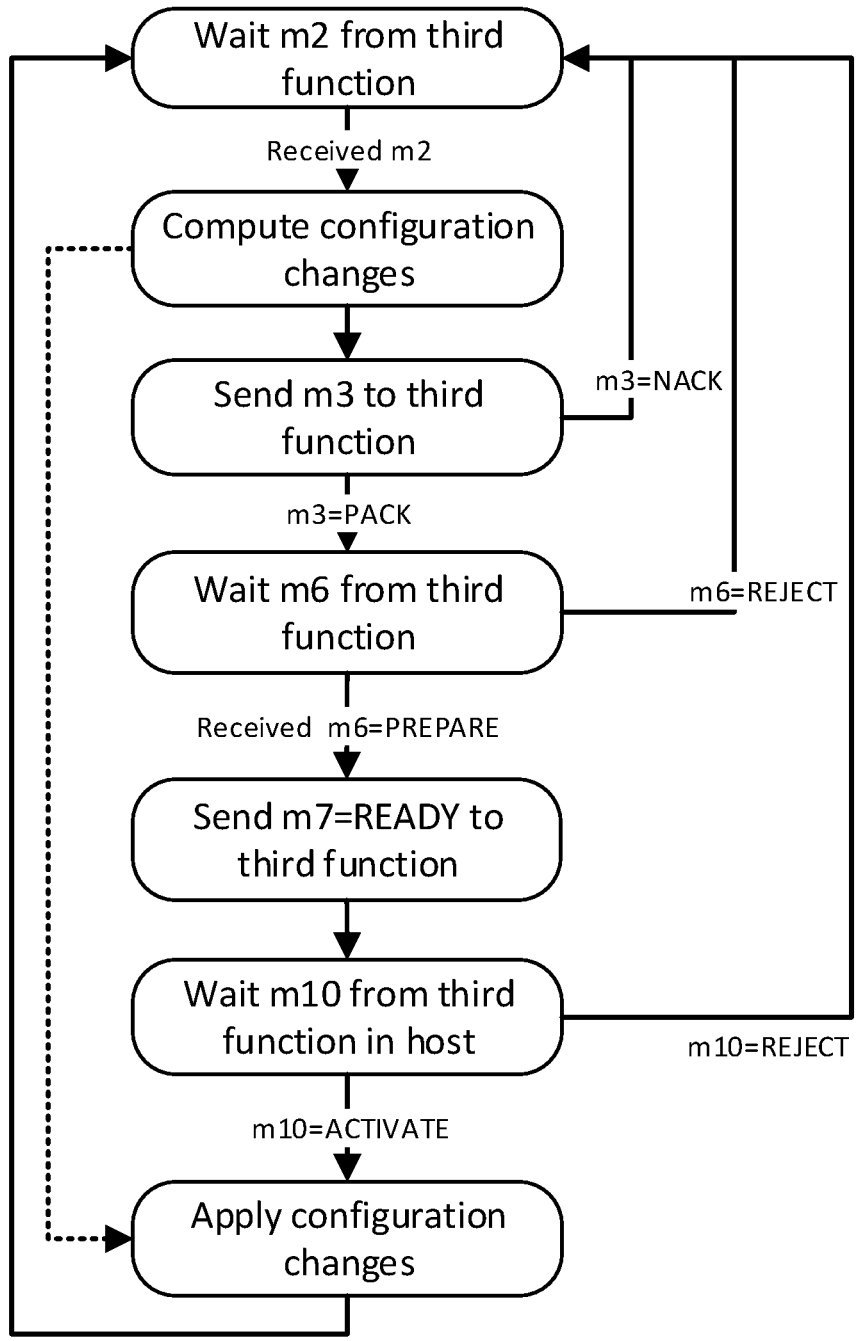
FIG. 4 depicts an example workflow of a fourth function according to the invention, FIG. 5 an example of modes and mode transitions, and FIG. 6 an example of an automotive computer system implementing a method according to the invention.

Fourth functions, ModeSwitchExecutor, may receive a request to execute a transition from a current mode to a new mode from said third functions via the reception of an m2-message, as illustrated in the workflow depicted in FIG. 4, wherein and m2-message comprises
the received reference to the new mode, and
the activation point in time in the future of the new mode,
and wherein, after receiving the m2-message, fourth func-
tions compute the necessary changes in the configuration of
the processing core on which said fourth function are
running, so that the software components, which have to run
on the processing core according to the new mode can be
activated, and wherein said changes in the configuration
comprise
a list of specific actions according to said transition
definition, and
a time-budget for each of said defined specific action, and
the current runtime state of the processing core, and
the characteristics of the runtime system of the processing
core, like its operating system, scheduling policy or
task dispatching mechanism, hypervisor or virtualiza-
tion layers, or characteristics related to the runtime
configuration of software components and resources.

It may be provided that fourth functions execute at the activation point in time said changes in the configuration, so that the new mode is activated, or It may be provided that fourth functions after receiving the m2 message from the third function, additionally per-forms local checks on its processing core to assess if the configuration changes on the processing core configuration according to the new mode can be performed, in particular
safely performed, for example in compliance with safety
functional requirements, and/or
timely performed, for example with consideration to said
computed time and/or said defined time-budget for said
list of specific actions, and
sends a so-called m3 message to the third function which is the source of the m2 message, wherein each particular fourth function sends the m3 message to the third function sourcing said m2 message, wherein
said m3 message is a NEGATIVE ACKNOWLEDG-
MENT message, if the changes cannot be performed,
and said fourth function finishes the mode transition
without performing configuration changes,
or
said m3 message is a POSITIVE ACKNOWLEDGMENT
message if the changes can be performed, and subse-
quently
(2) in the case that the m3 message is a POSITIVE
ACKNOWLEDGMENT message, said fourth func-
tions wait for the reception of a follow up message, the
so-called m6-message, from said third functions,
wherein if said received m6-message is a PREPARE message, said fourth functions execute the following steps:
  (i) computing the necessary changes on the processing core configuration of the processing core on which the fourth function is running, so that the software components of the new mode can be activated when said configuration is applied, and subsequently
  (ii) sending a message, the so-called m7-message, to the third function which is the source of the m6-message, wherein
    (ii.1) said m7-message is a READY message indicating the readiness of said fourth function to apply said configuration changes of the processing core, and subsequently
    (iii) waiting for the reception of a follow up messages, the so-called m10-message, from said third function, wherein
    (iv) if said m10-message is an ACTIVATION message, activating said configuration changes and finalize said mode change transition, or
    (v) if said m10-message is a REJECT message, finalize said mode change transition without applying said configuration changes,
  or
    (ii.2) said m7-message is a REJECT message indicating said fourth function cannot apply said configuration changes of the processing core, so that said fourth function finishes the mode transition without executing configuration changes,
or
if said m6-message is a REJECT message, finalizes the mode transition without executing any configuration changes.

It may be provided that the first function is running on a host of the hosts of the computer system.

It may be provided that the second function are running on a processing core of the hosts in the computer system. In particular, on each host of the computer system or at least on each host which is or may be involved in a mode transition a second function is running, namely on a processing core of each said host.

With respect to the third functions, the situation is the same as with the second functions.

It may be provided with respect to the fourth functions on each processing core of each host of the computer system or at least on each host which is or may be involved in a mode transition a fourth function is running.

EXAMPLE

Figure 6:
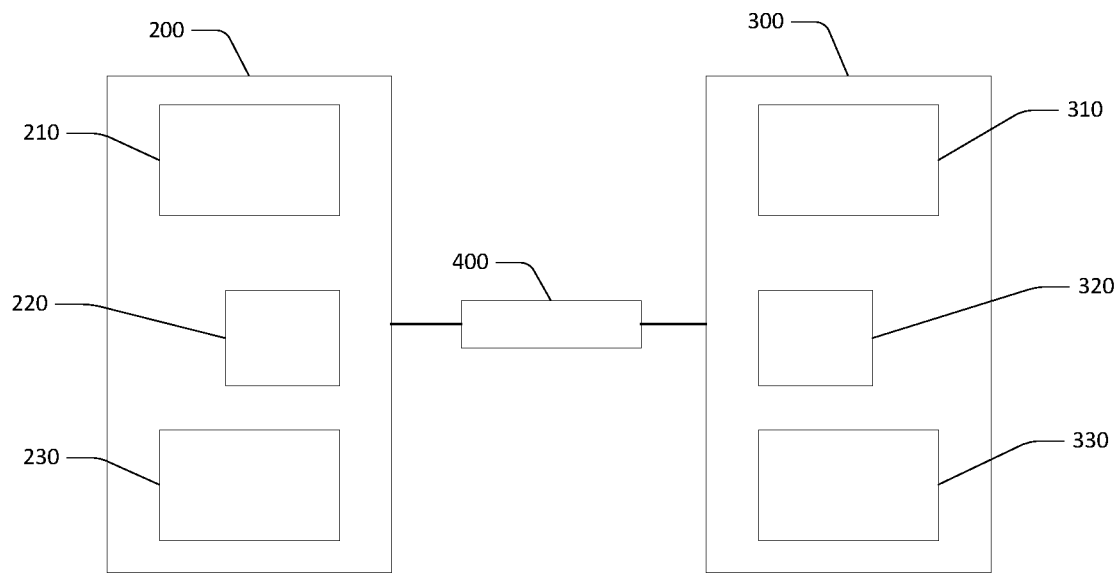

In the following a method according to the invention is described using an example based on an automotive computer system depicted in FIG. 6, comprising two hosts, so-called "host H1" 200, and so-called "host H2" 300, wherein host H1 comprises a processing core, "core C1" 210, a network interface ("NIC1") 220, and a graphical processing unit ("GPU1") 230. Host H2 comprises a processing core ("C2") 310, a network interface ("NIC2") 320, and another processing core ("C3") 330. Furthermore, the automotive computer system comprises a network switch 400 connecting hosts H1 and H2.

In this example it may be provided in the automotive computer system an operating system, "OS", and a software platform, "SP", run in all of said hosts and all of said processing cores.

Figure 5:
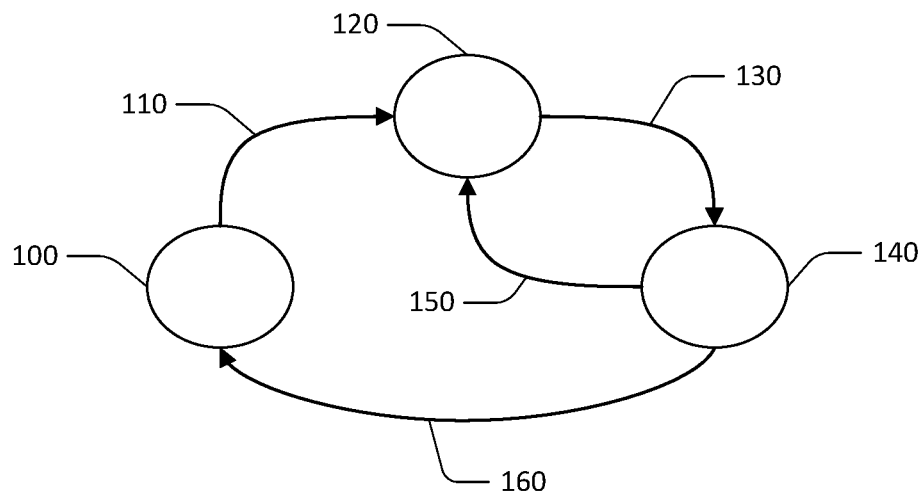

The example relates to a scenario depicted in FIG. 5, comprising five software components SWC1, SWC2, SWC3, SWC4, and SWC5, and three modes MODE A, 100, MODE B, 120, and MODE C, 140, as illustrated in Table 2.

TABLE 2

Example list mode definitions
Mode Definition

| Mode ID | MODE A | MODE B | MODE C |
| --- | --- | --- | --- |
| List of Software Components | SWC1<br>SWC2<br>SWC5 | SWC1<br>SWC2<br>SWC3<br>SWC5 | SWC1<br>SWC2<br>SWC4<br>SWC5 |

According to the example it is provided that
software component SWC1 is configured to run in processing core C1 of host H1 and utilize network interface NIC1,
software component SWC2 is configured to run in processing core C2 of host H2 and utilize network interface NIC2,
software component SWC3 is configured to run in processing core C1 of host H1 and utilize graphical processing unit GPU1,
software component SWC3 is configured to run in processing core C2 of host H2.
software component SWC4 is configured to run in processing core C2 of host H2, software component SWC5 is configured to run in processing core C3 of host H2.

The example relates to a simple scenario in which two software components, SWC1 and SWC2, perform a coordinated task requiring communication, for example a trajectory planning function realized with software component SWC2, requiring data from a GPS-based positioning function realized with software component SWC1, and wherein software components SWC3 and SWC4 are alternative implementations of the same functions, for example a trajectory rendering function, wherein software component SWC3 requires hardware support from GPU1 for rendering purposes, whereas software component SWC4 performs rendering without hardware support, allowing, for example, energy saving when high performance rendering is not needed. Software component SWC5 may perform monitoring and diagnosis tasks.

The example also relates to four defined transitions, transition AB, 110, transition BC, 130, transition CB, 150, and transition CA, 160, illustrated in Table 3.

TABLE 3

Example mode transition definitions

| Mode Transition | T-AB | T-BC | T-CB | T-CA |
| --- | --- | --- | --- | --- |
| Initial mode | MODE A | MODE B | MODE C | MODE C |
| Future mode | MODE B | MODE C | MODE B | MODE A |
| List of actions | A1 | A2<br>A3 | A4 | A5 |
| Points in time | T1 | T1 | T1 | T1 |

The specific actions listed on each transition definition in Table 3 correspond to the following:
A1: initialize SWC3, register GPU1
A2: deinitialize SWC3, unregister GPU1
A3: initialize SWC4
A4: initialize SWC3, register GPU1
A5: deinitialize SWC4
A6: deinitialize SWC4 wherein each specific action above may additionally comprise instructions necessary to perform said action when executed in one of the processing cores of said automotive computer system, wherein said instructions depend on implementation choices, like the selection of programming language, or software libraries, the characteristics of the processing core for which they are coded, like the CPU family, or the compiler used to compile a high level programming language, like C or C++, or the interpreter of an interpreted language, like Python.

According to the example the first function and the second function are permanently running on processing core C1 in host H1, and the third and fourth functions permanently run on processing cores C1 in host H1 and C2 in host H2.

It may be provided that a scenario like the one described above takes as initial configuration an automotive computer system as described, wherein the active mode is MODE A, and wherein said first function running in processing core C1 is configured to detect a input, for example, the selection of an entry in a menu on a touch screen, wherein said entry allows activating a trajectory planning function, causing said first function to send a request to said second function to transition to mode MODE B, via an m0-message, wherein the type of said m0-message is REQUEST, and wherein the reference to MODE B and the optional activation point in time T1 are provided, following the workflow depicted in FIG. 1.

It may be provided that the second function running on processing core C1 of host H1 receives said m0-message and propagates the request to third functions, in particular to a third function running on processing core C1 of host H1 and to a third function running on processing core C2 of host H2, via a m1-message, wherein the type of said m1-message is REQUEST, and wherein the reference to MODE B and the optional activation point in time T1 are provided, following the workflow depicted in FIG. 2.

It may be provided that third functions running on processing core C1 and processing core C2 receive said m1-message and propagates the request to fourth functions, in particular to a fourth function running on each of the processing cores C1, C2, and C3, via a m2-message, wherein the type of said m2-message is REQUEST, and wherein the reference to MODE B and the optional activation point in time T1 are provided, following the workflow depicted in FIG. 3.

It may be provided that fourth functions running on processing cores C1, C2, and C3, receive said m2-message and compute the changes in the configuration of the processing cores so that the software components which have to run in the new mode, MODE B, can be activated, wherein said computation is based on the current active mode, MODE A, and wherein said computation is additionally based on the specific actions in the mode transition definition T-AB, and wherein said computation computes the necessary instructions to perform said necessary changes based on the characteristics of the operating system, OS, and the software platform SP, and wherein the fourth function running in processing core C1 computes necessary changes, wherein said changes comprise
initialize SWC3, register GPU1,
with a computed time-budget, B1,
the fourth function running in processing core C2 computes necessary changes, wherein said changes comprise
no changes required,
with a computed time-budget 0,
the fourth function running in processing core C3 computes necessary changes, wherein said changes comprise
no changes required,
with a computed time-budget 0,
and wherein each said fourth function execute said computed changes, including said computed instructions, at the activation point in time T1, wherein said execution is completed no later than the point in time T1+B1.

That which is claimed is:

1. A method to execute a mode-transition in a multi-mode computer system comprising a multi-mode automotive computer system from a current mode to a future mode of a set of defined modes during run-time of the computer system, the method comprising:
running said computer system in a current mode, and wherein
said computer system comprises a set of two or more processing cores, and wherein
said computer system comprises two or more hosts, wherein each of said hosts comprises one or more of said set of processing cores,
and wherein
each processing core in said set of processing cores is configured to run one or more software components of a set of defined software components, and wherein
a set of two or more modes is provided,
wherein
each mode of said set of modes comprises
a unique mode identifier, and
a set of references to a subset of software components from the set of defined software components, wherein when a mode is active, all software components of the subset of software components of said mode are running in one or more processing cores of the set of processing cores of the computer system,
and wherein
only one mode from the defined set of modes can be active in said computer system at a time,
and wherein
the mode-transition, that is a transition from the current mode to a future defined mode, is executed at runtime, during operation, of the computer system, wherein a mode-transition is determined by a transition definition, wherein for each allowed mode-transition a transition definition is provided, wherein all transition definitions form a set of transition definitions, and wherein a transition definition between two defined modes comprises
a reference to the initial mode
a reference to the future mode
a list of specific actions to be executed during the mode-transition, and
one or more points in time, relative to the runtime of the software components in the old mode, when the mode-transition can be initiated, wherein
said list of specific actions comprises at least one of:
de-initialize a software component of the set of software components in the current mode, and
un-register resources, like memory, hardware devices, or software services, not anymore required in the future, new, mode, and
initialize a software component of the set of software components in the new mode,
register resources, like memory, hardware devices, or software services, required by software components in the new mode, and (re)configure the runtime system of one or multiple processing cores to run the set of software components in the new mode, and reconfigure software services like error handlers, monitoring systems, watchdogs, and middleware, to the new set of software components in the new mode, and wherein said set of transition definitions and said set of modes are available to all processing cores in said set of processing cores wherein (1) a first function is provided, which first function is running on a host of the hosts of the computer system, wherein said first function (a) receives a request to execute a transition from a current mode to a defined future mode, the new mode, and (b) after receiving said request selects a transition definition from said set of transition definitions for said mode-transition, said transition definition defining the mode-transition from the actual active mode to the future mode, and wherein said first function computes, based on said transition definition, a point in time in the future, the activation point in time, at which activation point in time said new mode shall become active, and wherein said computation is based on one of said points in time in the transition definition, relative to the runtime of the software components in the old mode, when the mode-transition can be initiated, or a globally defined relative point in time for the initiation of the transition, or a point in time at the end of a predefined interval, or the next possible point in time after the reception of said request, or a point in time according to a defined static assignment of transition points in time, or a point in time received alongside said request to execute a transition, (2) a second function is running on a processing core of the hosts in the computer system, and wherein the first function transmits a m0-message to said second function, wherein said m0-message comprises a reference to the new mode, and the computed activation point in time, (3) third functions are provided, wherein a third function is running on a processing core in each of the hosts of the computer system, and wherein the second function, after receiving the m0-message, propagates the information of said m0-message via m1-messages to third functions or to each of said third functions, wherein each m1-message is a message comprising the received reference to the new mode, and the activation point in time in the future of the new mode, and wherein the third functions receive an m1-message requesting a mode-transition in the processing cores of its related hosts, wherein (4) fourth functions are provided, wherein on each processing core of the computer system a fourth function is running, and wherein the third functions, after receiving the m1-message, distribute the information of said m1-message to fourth functions running on a processing core comprised in the host related to said third functions via m2-message(s) wherein each m2-message is a message including the received reference to the new mode as well as the activation point time for the new mode, and wherein the fourth functions extract, after receiving an m2-message, the reference to the new mode and the activation point in time from the received m2-messages and compute the necessary changes in the configuration of the processing core in which said fourth function is running, so that the software components, which have to run on the processing core according to the new mode are activated, and wherein said computation of changes in the configuration is based on the current runtime state of the processing core, and the characteristics of the runtime system of the processing core, and the new and old modes, and wherein said computed changes in the configuration comprise the execution of a list of specific actions according to said transition definition, and the time-budget for each of said defined specific action, and and wherein said fourth functions execute at the activation point in time said changes in the configuration, so that the new mode is activated.

2. The method according to claim 1, wherein (1) each fourth function, after receiving the m2 message from the third function, additionally performs local checks on its processing core to assess if the configuration changes on the processing core configuration according to the new mode can be performed:

safely in compliance with safety functional requirements, and timely with consideration to said computed time and said defined time-budget for said list of specific actions, and sends a m3 message to the third function which is the source of the m2 message, wherein each fourth function sends the m3 message to the third function sourcing said m2 message, wherein said m3 message is a negative acknowledgement message, based on a determination that the changes cannot be performed, and said fourth function finishes the mode transition without performing configuration changes, or said m3 message is a positive acknowledgement message based on a determination that the changes can be performed, and subsequently (2) in the case that the m3 message is a positive acknowledgement message, said fourth functions wait for the reception of a m6-message from said third functions, wherein i based on a determination that said received m6-message is a prepare message, said fourth functions execute the following steps:

(i) computing the necessary changes on the processing core configuration of the processing core on which the fourth function is running, so that the software components of the new mode can be activated when said configuration is applied, and subsequently (ii) sending a m7-message to the third function which is the source of the m6-message, wherein (ii.1) said m7-message is a ready message indicating the readiness of said fourth function to apply said configuration changes of the processing core, and subsequently (iii) waiting for the reception of a m10-message from said third function, wherein (iv) based on a determination that said m10-message is an activation message, activating said configuration changes and finalize said mode change transition, or (v) based on a determination that said m10-message is a reject message, finalize said mode change transition without applying said configuration changes, or (ii.2) said m7-message is a reject message indicating said fourth function cannot apply said configuration changes of the processing core, so that said fourth function finishes the mode transition without executing configuration changes, or based on a determination that said m6-message is a reject message, finalizes the mode transition without executing any configuration changes, and wherein (3) said third functions, after sending the m2-messages to the fourth functions, wait for m3-messages (m3_1 ... m3_n) from their corresponding fourth functions running on each processing core, and, after receiving said m3-messages from their corresponding fourth functions communicate a m4-message to the second function, which is the source of the m1-message, and wherein said m4-message is a negative acknowledgement message, based on a determination that at least one of said m3-messages is a negative acknowledgement message, and said third function finishes the mode transition without executing configuration changes, or said m4-message is a positive acknowledgement message, based on a determination that all said m3-messages are positive acknowledgement messages, and subsequently (i) said third functions wait for a m5-message from the second function and propagate said m5-message or the content of said m5-message to its fourth functions, via the m6-message, and (i.1) based on a determination that said m5-message is a reject message, said m6-message is a reject message, and said third function finishes the mode transition without executing configuration changes, or (i.2) based on a determination that said m5-message is a prepare message, said m6-message is a prepare message, and subsequently executes the steps of:

(ii) waiting for m7-messages (m7_1 ... m7_n) from the fourth functions running on each related processing core and subsequently communicate a m8-message to the second function, which is the source of the m5-message, and (ii.1) based on a determination that any of said m7-messages is a reject message, said m8-message is a reject message, and said third function finishes the mode transition without executing configuration changes, or (ii.2) based on a determination that said m7-messages are all ready messages, said m8-message is a ready message, and executes the steps of:

(iii) wait for a m9-message from the second function, and after receiving said m9-message propagate said m9-message or the content of said m9-message to the fourth functions with a message, the so called m10-message, and (iii.1) based on a determination that said m9-message is an activate message, said m10-messages are activate messages, or (iii.2) based on a determination that said m9-message is a reject message, said m10-messages are reject messages, and said third function finishes the mode transition without executing configuration changes, and wherein (4) said second function, after sending the m1-messages to the third functions, waits for m4-messages (m4_1 ... m4_n) from the third functions running on each host, and after receiving said m4-messages communicate a m5-message to said third functions, and wherein, based on a determination that (a) said m4-messages (m4_1 ... m4_n) comprise a message of each host, and (b) each of said m4-messages (m4_1 ... m4_n) is a positive acknowledgement message, said m5-message is a prepare message, and subsequently, (i) said second function waits for messages, the m8-message (m8_i), from the third functions running on each host (host_i), and, after receiving m8-messages from said third functions, communicate a m9-message (m9) to said third functions, wherein (i.1) based on a determination that said m8-messages (m8_1 ... m8_n) comprise an m8-message of each third function, and based on a determination that all said m8-messages are ready messages, said m9 message is a activate message, or otherwise (i.2) said m9-message is a reject message, or otherwise, based on a determination that at least one of (a) or (b) are not fulfilled, said m5-message is a reject message and the mode transition is terminated without performing configuration changes.

3. The method according to claim 1, wherein the configuration changes computed by one or more of said fourth functions include the modification of a time-triggered schedule, wherein said modifications are based on a precomputed offline time-triggered schedule, wherein all software components in a set of software components of said new mode are included, or an online computed time-triggered schedule, wherein all software components in the set of software components of said new mode are included, or either a precomputed or online generated incremental time-triggered schedule, wherein said incremental time-triggered schedule comprises a set of necessary modifications to the actual time-triggered schedule to adapt to the changes between the set of software components of said old mode and the sets of software components of said new mode.

4. The method according to claim 1, wherein said first, second, third and fourth function initiate timeout counters after sending anyone of said messages m0 ... m10, and wherein said counters are initialized with defined time intervals, wherein said counters decrease with the progression of time, and wherein said first, second, third, and fourth functions limit the waiting time for messages to the time until said counter timeout expires, and wherein based on a determination that no message is received within said timeout interval said function(s) is(are) terminated without performing configuration changes.

5. The method according to claim 1, wherein at least one or all functions of the first, second, and third function are replicated, wherein
each function sending a message to a replicated function sends a replicated message to each replica of said replicated function, and wherein
each function receiving a message from a replicated function receives a replicated message from each replica of said replicated function, and wherein
replicated messages are collected by the receiving function and compressed to appear as a single message applying a defined criterion, wherein said defined criterion is
selecting the highest priority replica among a defined priority of preference for said replicated messages, or
implementing a voting mechanism among said replicated messages, or
selecting one among said replicated messages based on the reception order comprising the first one.

6. The method according to claim 1, wherein if the transition definition of a mode-transition definition does not require configuration changes to one or more unaffected processing cores of said set of processing cores in the system, the fourth functions of said unaffected processing cores are excluded from said mode-transition by not participating in the exchange of any of said messages, m0 . . . m10-messages, with the related third functions in the related host.

7. The method according to claim 1, wherein if the transition definition of a mode-transition definition does not require configuration changes to one or more unaffected hosts of said set of hosts in the system, so that said third functions are excluded from said mode-transition by not participating in the exchange of any of said messages, m0 . . . m10-messages, with the related second functions in said computer system.

8. The method according to claim 1, wherein said first, second, third, and fourth functions are implemented in software components, wherein
said software components are included in the set of software components in the computer system, and wherein
at least one or more of said software components are included in the set of software components for each transition definition in said computer system.

9. The method according to claim 1, wherein said first, second, third, and fourth functions are implemented as one or more operating system services, software libraries, middleware, or hypervisor or as hardware in a field programmable gate array (FPGA) or application-specific integrated circuit (ASIC) component in said computer system, or firmware as an embedded program for a micro-controller in said computer system.

10. The method according to claim 1, wherein at least one of said messages, m0 . . . m10-messages, are transmitted by means of inter-host communication, or by means of intra-host communication mechanisms, including at least one of: inter-process communication (IPC) or run-time environment (RTE) communication.

11. The method according to claim 1, wherein said computer system additionally comprises a communication network, wherein said communication network comprises end nodes and starcouplers, like bridges, switches, or routers, and communication buses, and wherein
each of said one or more hosts in said computer system is comprised in one of said end nodes or starcouplers, and wherein
said communication network is configured to transport said messages, m0 . . . m10 messages, between the respective sender and receivers of said functions, and wherein
said configuration of said communication network comprises configuration related to said end nodes and starcouplers, and communication buses, and wherein
the configuration changes computed by one or more of said fourth functions include changes to said configuration of said communication network.

12. The method according to claim 11, wherein said communication network is a time-triggered communication network, wherein
said modifications of said configuration of said time-triggered communication network are based on
a precomputed offline time-triggered communication schedule, wherein all or a subset of the communications between the software components of said new mode are included, or
an online computed time-triggered communication schedule, wherein all or a subset of the communications between the software components in the set of software components of said new mode are included, or
either a precomputed or online generated incremental time-triggered communication schedule, wherein said incremental time-triggered schedule comprises the necessary modifications to the actual time-triggered communication schedule for the communications between the software components in the set of software components of said new mode.

13. The method according to claim 1, wherein the computer system comprises a hypervisor, wherein
one, or more, of said processing cores in said computer system is a virtual processing core, and
one, or more, of said hosts in said computer system is a virtual host, and
part of said communication network is a virtual network.

14. A computer system comprising a set of two or more processing cores, wherein said computer system comprises one host, which host comprises said set of processing cores, or wherein said computer system comprises two or more hosts, wherein each of said hosts comprises one or more of said set of processing cores, and wherein each processing core in said set of processing cores is configured to run one or more software components of a set of defined software components, and wherein a set of two or more modes is provided, wherein the computer system is configured to execute a method according to claim 1.

15. The method according to claim 1, wherein the unique mode identifier is an index in a defined table of modes, or a memory pointer, or a unique name identifying the mode, or a result of a hash function, or an arbitrary reference globally and unambiguously identify the mode.

16. The method according to claim 1, wherein each action in the list of specific actions comprises a defined time-budget for said action to be completed during runtime.

* * * * *